United States Patent Office 3,077,038
Patented Feb. 12, 1963

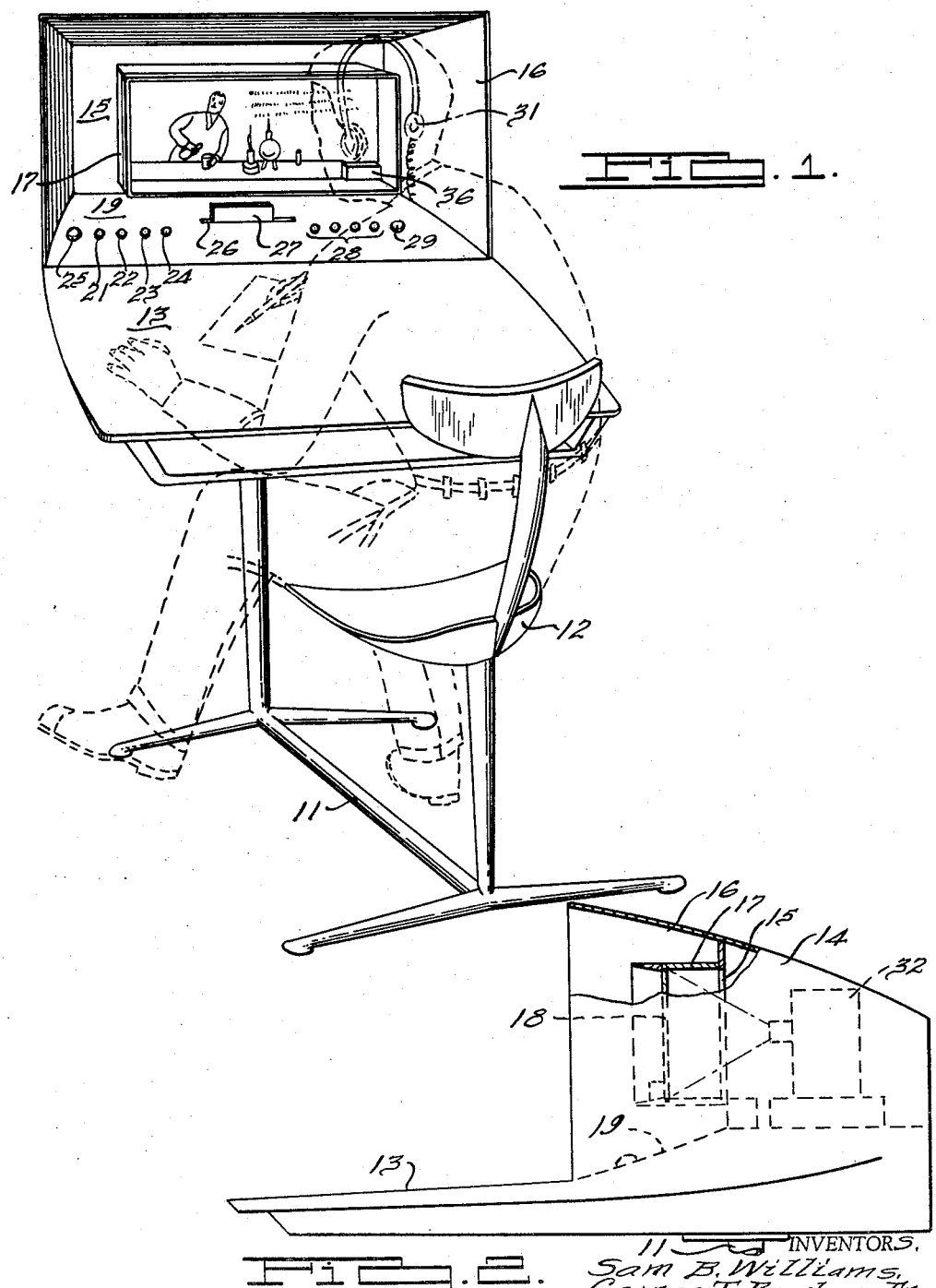

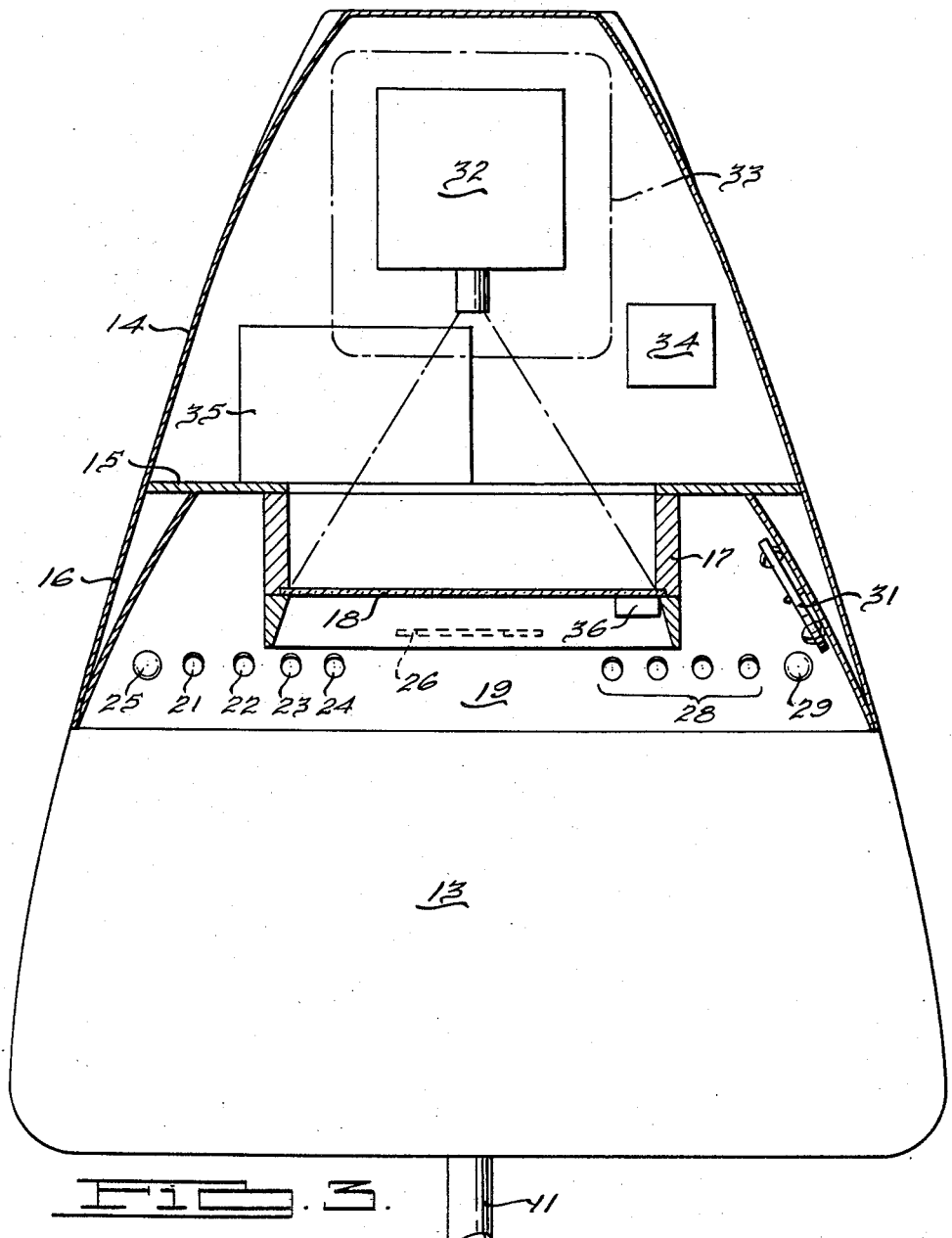

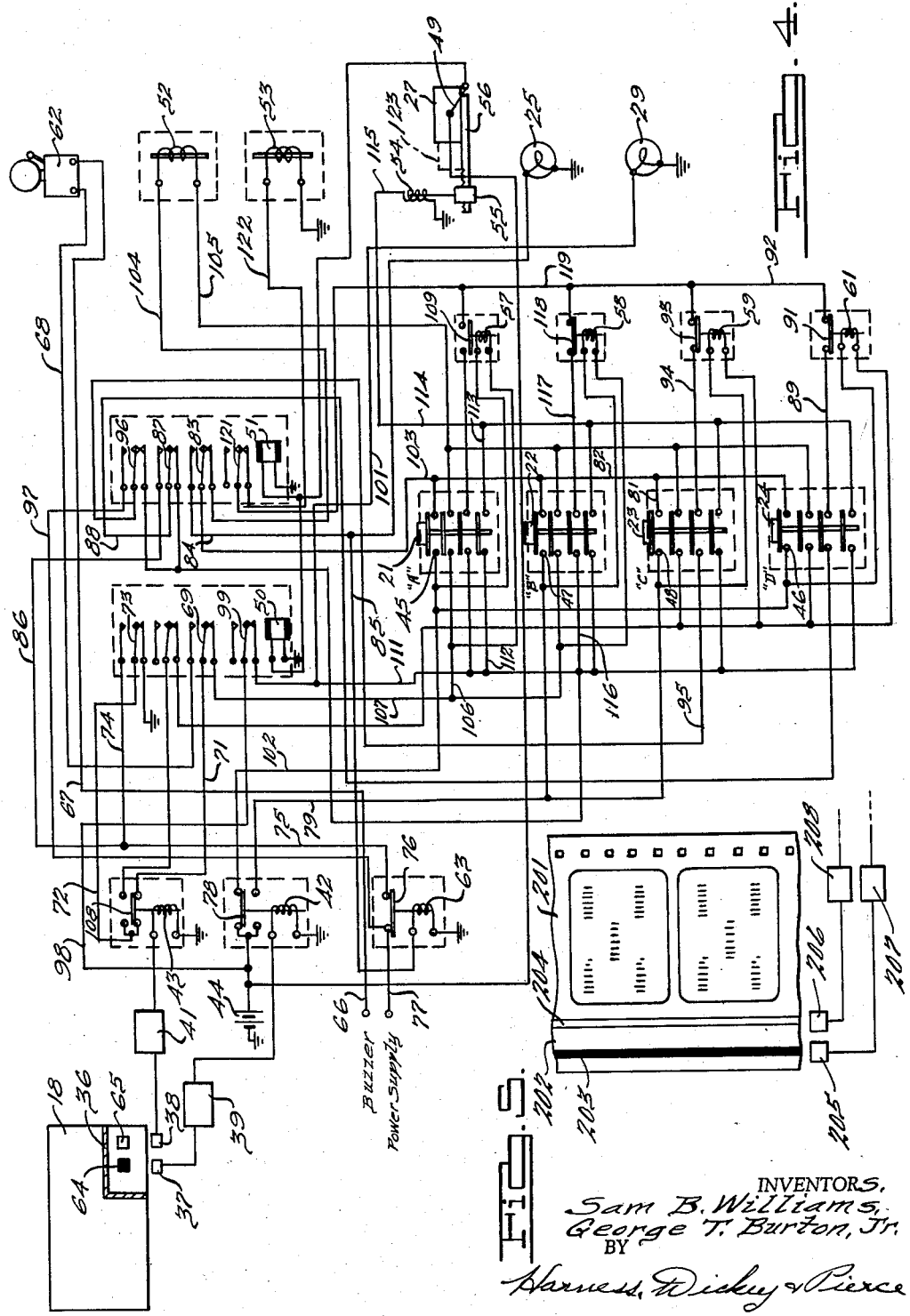

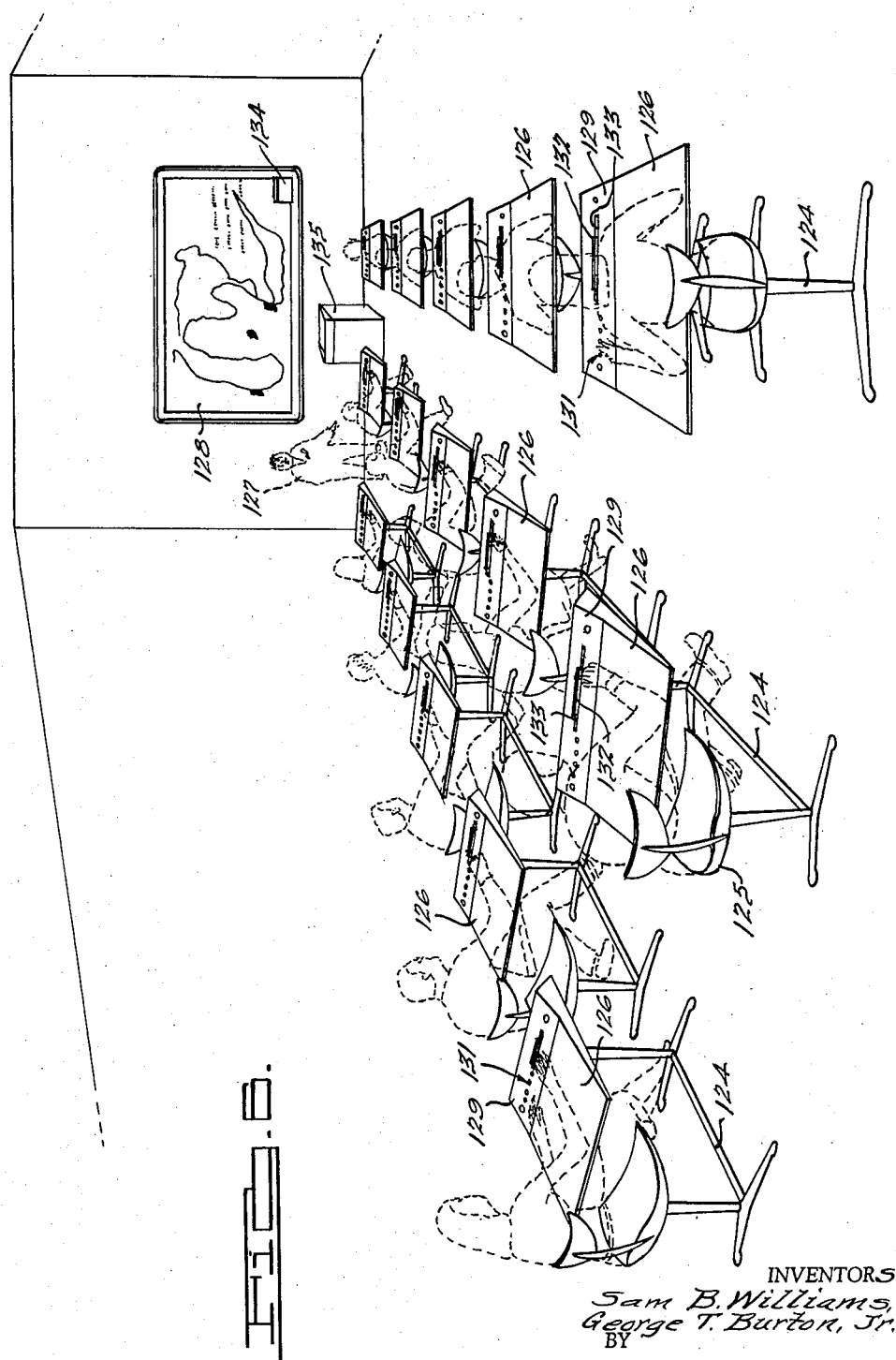

3,077,038
INSTRUCTIONAL DESK
Sam B. Williams and George T. Burton, Jr., Birmingham, Mich., assignors to Williams Research Corporation, Birmingham, Mich., a corporation of Michigan
Filed Oct. 10, 1958, Ser. No. 766,542
16 Claims. (Cl. 35—9)

This invention relates to instructional devices, and more particularly to arrangements by means of which students may be provided with individual instruction and testing.

The rising awareness of shortcomings in our educational system, especially in the sciences and allied fields, together with an increasing shortage of qualified instructors, have meant that novel approaches to our conventional methods of instruction are urgently needed. It is a general object of the present invention to provide a unique instructional tool which, while providing a solution to the problem of teacher shortages, does not sacrifice any of the important advantages which flow from conventional classroom teaching methods.

It is another object to provide an improved instructional device of this character which is extremely flexible in its adaptations and may be used in conjunction with slides, motion pictures or television projection for individual instruction and testing.

It is also an object to provide an improved instructional device of this nature which may be used for individual instruction in a supervised classroom in such manner that a student's inattention will be made to the supervisory authority.

It is another object to provide an instructional device having the above characteristics, which may be selectively actuated to administer a recorded objective examination to the individual student, and which prevents the possibility of cheating on such examination.

It is a further object to provide an improved instructional device of the above character which may be individually controlled by the student, thus permitting him to obtain the instruction at a pace in accordance with his learning rate.

It is another object, in one embodiment of the invention, to provide an instructional device of this character which may be used for testing purposes in a classroom with a single instructor who is either present in person or who instructs by means of slides, motion pictures or television projection.

It is also an object to provide an improved instructional device of this nature which is simple and inexpensive to construct and uses conventional materials and equipment.

Other objects, features and advantages of the present invention will become apparent from the following detailed description taken in conjunction with the accompanying drawings, wherein:

FIGURE 1 is a perspective view of a suitable embodiment of the instructional desk combined with a student chair;

FIGURE 2 is a side elevational view of the desk with parts broken away;

FIGURE 3 is a top plan view of the desk in cross section showing suitable locations for the various components thereof;

FIGURE 4 is a circuit diagram showing the various testing components;

FIGURE 5 is an elevational view of a portion of film carrying signal means on its sound track area; and FIGURE 6 is a perspective view of another embodiment of the invention which is basically similar to the first embodiment but does not incorporate an individual projector, for use in classrooms having a common instructor.

In general terms, the first illustrated embodiment of the invention comprises a desk at which a student sits, and which has an upwardly extending housing with a hooded screen facing the student. Means are provided within the housing for carrying a film projector, slide equipment, or television apparatus which will project an image on the back of the translucent screen or on the cathode ray tube to be viewed by the student sitting at the desk. In this manner, a vast number of students may be taught by a single instructor who either records his instruction on film or who uses television transmission. In the case of film use, means are provided on the desk for permitting the individual student to change the rate of film advance or to reverse the film in order to review a section thereof.

Means are also provided for two types of tests, an informal type in which the student is permitted to check his own knowledge or is tested for attentiveness, or a more formal type in which the answers to objective questions are recorded on a punch card. An audible signal is also provided for attracting the attention of a class supervisor should a student, through inattention, fail to answer correctly questions put to him on the viewing screen during the first type of test. In another embodiment of the invention, the individual viewing screen is omitted so that the desk may be used for testing purposes by an individual class instructor or a single projected image viewed by the whole class.

Referring more particularly to FIGURES 1, 2 and 3 of the drawings, a preferred embodiment of the instructional device comprises a tubular frame 11 at one end of which is a student seat 12. The other end of the frame supports a desk 13 of generally rectangular shape, the far end of the desk having a housing 14 seen best in FIGURES 2 and 3 which is of forwardly flared shape for improved appearance. The forward portion of this housing has a transverse wall 15 and a hood 16 extends forwardly from wall 15 as a continuation of the housing. Spaced inwardly from hood 16 and projecting forwardly from wall 15 is a rectangular enclosure 17 at the forward end of which is a screen 18. This screen may be of a translucent type to carry images projected from a slide or motion picture projector, or may be a television cathode ray tube. For purposes of the illustrated embodiment, it will be assumed that screen 18 is intended to carry a motion picture image projected onto its surface so that a student sitting in seat 12 may watch the image.

The rear portion 19 of desk 13 slopes upwardly and rearwardly beneath enclosure 17 and carries the student-operated controls and indicators for the instructional device. More particularly, a set of four push buttons 21, 22, 23 and 24 are provided, these push buttons being used for multiple-choice questions in the card test, while push buttons 23 and 24 are additionally used for true-false questions in both the card test and informal test. On the left side of push buttons 21 to 24 is a lamp 25 which will be lit when the device is in the informal or self-test condition and a correct answer is selected by the student. In a central portion of the desk is a test card slot 26 which is adapted to receive a test card 27. It will be noted that slot 26 is somewhat longer than card 27 so that the card may move longitudinally in the slot during the punch card operation. On the right-hand side of the desk is a group of controls generally indicated at 28. Although these controls are not described in detail, it will be understood that they comprise conventional control switches for a motion picture projector, by means of which the film may be stopped, advanced a frame at a time, or run at different rates of speed either forwardly or in reverse. To the right of controls 28 is a signal lamp 29 which will be illuminated when the card test is being run. Also mounted at the right-hand side of the desk is a set of earphones 31 for the student's use when listening to the soundtrack of the film being projected.

The interior of housing 14 is adapted to enclose the film projector and associated equipment which will all be of a conventional nature and are therefore not shown in detail. Movie projector 32 is adapted to project an image on the back of screen 18, and an access cover shown in dot-dash lines at 33 may be provided in the top of housing 13 for changing the film. A transformer 34 is shown as being disposed within housing 14, and a control and circuit chassis 35 is also enclosed by the housing. It will be understood that the invention is not limited to a particular location of projector 32 or the other system components, and that the image from the projector could be transmitted to screen 18 by mirrors if the location of the projector made this desirable. A small compartment 36 is mounted in the lower right-hand corner of screen 18 and is adapted to contain two photocells for purposes described below, these photocells being sensitive to projected light and dark areas on the adjacent portion of the screen.

FIGURE 4 illustrates in partially schematic form a preferred circuit arrangement by means of which the self-test and the card test may be administered. The four push buttons 21, 22, 23 and 24 are labeled A, B, C and D respectively to represent four multiple-choice answers. Photocells 37 and 38 within housing 36 are connected to amplifiers 39 and 41 respectively, these amplifiers in turn being connected to relays 42 and 43. Relay 42 is movable between an upper or deenergized position and a lower or energized position. In its upper position, relay 42 will connect voltage supply 44 with terminals 45 and 46 on the upper contacts of push buttons 21 and 24 respectively. In its lower position, relay 42 will connect the voltage supply with terminals 47 and 48 on the upper set of contacts of push buttons 22 and 23 respectively.

A switch 49 is provided below slot 26, this switch being movable by insertion of card 27 in the slot from an open position for self-test purposes to a closed position in which voltage is supplied to two card test relays 50 and 51. The various switches controlled by these relays are connected to photocell relays 42 and 43 and to push buttons 21 to 24, as well as to two card punch solenoids 52 and 53. Solenoid 52 may be termed the "correct" punch card solenoid and solenoid 53 the "incorrect" punch card solenoid. Also connected to the switches controlled by relays 50 and 51, through push buttons 21 to 24, is a card advancing solenoid 54 which controls a pawl and ratchet escapement indicated schematically at 55 for moving a carriage 56 on which punch card 27 is carried when it is inserted in slot 26. As stated previously, insertion of card 27 in slot 26 will cause switch 49 to move from its self test to its card test position, while removal of the punch card will cause the switch to shift to its self test position.

Also connected to push buttons 21 to 24 are incorrect cutout relays 57, 58, 59 and 61 respectively, these relays being enabled by the energization of card test relay 50 as will be described below in order to control proper actuation of the punch card solenoids. A buzzer 62 is also provided for warning a classroom supervisor when a student's inattention causes him to answer a self test question incorrectly. A buzzer override relay 63 is provided in the circuit of buzzer 62, the override relay being movable between an upper position when the override relay is deenergized and a lower position when the override relay is energized. In its upper position, the buzzer power supply will be connected in the circuit, but in the lower position the buzzer power supply will be disconnected except under certain conditions described below. When card test relays 50 and 51 are energized due to the insertion of the punch card 27, the buzzer power supply circuit will be open due to the position of the switches controlled by relays 50 and 51.

The remaining details of the circuit diagram of FIGURE 4 may perhaps best be understood by a description of the operation of the device. Assuming that a student is seated at the desk, he will watch screen 18 on which will be projected a lecture or demonstration with accompanying sound which may be heard through ear-phones 31. By means of the controls generally indicated at 28, the student may speed up, slow down, or repeat portions of the filmed lecture. Since no punch card 27 is inserted in slot 26, switch 49 will be in the self test position. Thus, relays 50 and 51 will be deenergized, and the switch contacts thereof will be in their upper position, not in their lower position as shown in the drawing.

Assuming that the lecture or demonstration has been so planned that periodic true-false questions are to be asked of the student in order to retain his attention and indicate his comprehension of the material, a position on the film will be reached at which the instructor will ask a question. Imprinted on the film so as to be projected toward photocells 37 and 38 are two squares 64 and 65, square 64 being opposite photocell 37 and square 65 opposite photocell 38. During a normal film sequence which consists merely of instruction or demonstration, these two squares will be dark so that no light is transmitted to the photocells. However, in the film frames immediately following a question having the answer "true," square 64 will be light; if the answer is "false," this square will be dark in the frames following the question. Square 65 will be light in the frames following a question whenever buzzer 62 is to be armed, and will be dark at all other times.

Supposing for example that the instructor on the film asks a question, the answer to which is "true," square 64 will be light, and if it is desired that buzzer 62 be armed, square 65 will also be light. These two light squares will appear on those frames of the film immediately following the frames in which the instructor asks the question, and will continue through sufficient frames to enable the student to give his answer by pressing either one of push buttons 23 and 24.

The energization of photocell 37 by light square 64 will cause energization of relay 42, thus supplying voltage to terminal 48 of push button 23. Energization of photocell 38 by light square 65 will cause energization of relay 43, arming buzzer 62 through the following circuit: From one side 66 of the buzzer power supply, through wire 67, buzzer 62, wire 68, switch 69, wire 71, relay 43, wire 72, switch 73, wires 74 and 75, and contact 76 of relay 63 to the other side 77 of buzzer power supply.

Assuming that through inattention or hesitation the student has not pushed either of push buttons 23 or 24, closure of the buzzer circuit will cause buzzer 62 to sound. Assuming that the answer to the question is "true" and that relay 42 is therefore in its downward or energized position because of light square 64, actuation of push button 23 by the student will cause illumination of student self check lamp 25 through the following circuit: From voltage supply 44, through the movable contact 78 of relay 42, wire 79, contact 48, push button 23, wires 81 and 82, switch 83, and wire 84 to lamp 25. A circuit will also be completed through buzzer override relay 63 as follows: The same circuit as described above up to wire 84, then through wire 85 and buzzer override relay 63. This will move relay contact 76 out of the buzzer circuit and the buzzer will not sound. In order to prevent operation of the buzzer should the student release push button 23 before film square 65 again becomes dark, relay 63 may be of a slow return type.

Assuming that the student presses push button 24, thinking that the answer to the question is "false," lamp 25 will not be illuminated since push button 23 will not close the circuit to this lamp. Moreover, the circuit to buzzer override relay 63 will not be closed, so that the buzzer will sound. Should the student press both push buttons 23 and 24, lamp 25 will be illuminated and override relay 63 energized, but buzzer 62 will sound because the two terminals of buzzer override relay 63 will be short-circuited through the following circuit:

From side 66 the buzzer power supply through wire 67, buzzer 62, wire 68, switch 69, wire 71, relay 43, wire 72, switch 73, wires 74 and 86, switch 87, wire 88, push button 24, wire 89, contact 91 of incorrect cutout relay 61, wire 92, contact 93 of incorrect cutout relay 59, wire 94, push button 23, wire 95, switch 96 and wire 97 to side 77 of the buzzer power supply.

Should the answer to a question be "false," square 64 will be dark on the film frames immediately following the question, thus causing relay 42 to be in its upper or deenergized position. Voltage will thus be supplied to terminal 46 of push button 24, and if this push button is pressed by the student, lamp 25 will be illuminated and buzzer override relay 63 will be energized by a circuit similar to that described above with respect to push button 23. Here again, if the student fails to push either push button or pushes both push buttons 23 and 24, buzzer 62 will sound by means of a circuit similar to that described above. It will thus be seen that a simply operated and fool-proof arrangement is provided by means of which the student's attention and comprehension of the lecture may be ascertained by the student himself or the classroom supervisor.

For instances where a formal recorded test is desired, such a test will be provided on the motion picture film with proper notification to the student so that he may insert test card 27 in slot 26. Since switch 49 is so arranged that insertion of card 27 in the slot will shift the switch from its self test to its card test position, circuits will be closed to relays 50 and 51, shifting their corresponding switches to the positions shown in FIGURE 4. Energization of relay 50 will close the circuit to card test lamp 29 as follows: From voltage supply 44 through wire 98, switch 99, and wire 101 to card test lamp 29. Card 27 will rest on carriage 56, which, as mentioned previously, will be movable from one extreme position to the other in successive increments by energization and deenergization of solenoid 54. More particularly, the advancing mechanism is so arranged as to be cocked when solenoid 54 is energized and to advance carriage 56 when the solenoid is deenergized. Punch card solenoids 52 and 53 are adjacent card 27 and will thus place a double row of holes in punch card 27 which will record whether each question is answered correctly or incorrectly.

The questions which may be asked in the card test may be either of a multiple-choice type or a true-false type. The multiple-choice questions may have up to four choices per question in the illustrated embodiment. This is obtained by the four possible combinations of light and dark squares in the lower right-hand corner of the screen. For reference purposes, the four push buttons are labeled A, B, C and D, and the combinations of light and dark squares are listed as follow:

*Card Test*

| Square | | Answer | Push Button |
|---|---|---|---|
| 64 | 65 | | |
| Dark | Light | A | 21 |
| Light | Light | B | 22 |
| Light | Dark | C or True | 23 |
| Dark | Dark | D or False | 24 |

Assuming that the first question is a multiple-choice question and that the correct answer is A, relay 42 will be in its upper or deenergized position and relay 43 will be in its lower or energized position. Actuation of push button 21 by the student will cause energization of "correct" punch card solenoid 52 through the following circuit: From voltage supply 44, through contact 78 of relay 42, line 102, push button 21, wire 103, switch 83, wire 104, solenoid 52, wire 105, push button 21, wire 106, wire 107, switch 69, wire 71, contact 108 of relay 43, wire 72, and switch 73 to ground. This will cause card 27 to be punched, recording a correct answer to the first question.

Incorrect cutout solenoid 57 will also be energized, since this solenoid is connected between wires 102 and 106. Contact 109 of solenoid 57 will thus move to cause opening of the circuit to "incorrect" punch card solenoid 53, preventing energization of this solenoid when push button 21 alone is depressed. Actuation of push button 21 will also energize punch card advancing solenoid 54 through the following circuit: Voltage supply source 44, wire 98, switch 99, wire 111, wire 112, push button 21, wire 113, wire 114, and wire 115 to solenoid 54. As mentioned previously, this will cock advance mechanism 55, and upon release of push button 21 carriage 56 will be advanced as solenoid 54 is deenergized.

Should any of the other push buttons 22, 23 or 24 be depressed instead of push button 21, the "incorrect" punch card solenoid 53 will be energized. For example, should push button 22 be depressed, a circuit to the "incorrect" punch card solenoid will be completed as follows: From voltage supply source 44 through wire 98, switch 99, wire 111, wire 116, push button 22, wire 117, contact 118 of relay 58, wire 119, switch 121 and wire 122 to solenoid 53. At the same time, solenoid 54 will be energized to advance the card in the same manner as described above with respect to push button 21. However, "correct" punch card solenoid 52 will not be energized because of the relative positions of relays 42 and 43. In a similar manner, should push button 23 or 24 be depressed, punch card solenoid 53 and card advancing solenoid 54 will be energized.

Should the student depress push button 21 as well as one or more of the other push buttons, both the "correct" and "incorrect" punch card solenoids will be energized, thus recording an invalid answer to the multiple-choice question. Should the student attempt to check an answer by removing the card, card test lamp 29 will be extinguished. If desired, this lamp may be mounted in a position visible by a classroom supervisor so that such unauthorized checking will be detected.

Should the answer to the multiple-choice question be "B" instead of "A" the student may obtain a "correct" recordation by depressing push button 22, the circuits being traceable in a similar manner to those described above, keeping in mind that in this case both relays 42 and 43 will be in their energized or lower positions because both squares 64 and 65 are light. Should the correct answer be "C," square 64 will be light and square 65 dark, so that relay 42 is in its lower or energized position and relay 43 is in its upper position. With this arrangement, depression of push button 23 will cause the "correct" solenoid to operate. Lastly, with both squares 64 and 65 dark, both relays 42 and 43 will be in their upper position so that push button 24 will have to be depressed to record a correct answer. It should be noted that when switch 49 is in its card test position, switch 69 of relay 50 will be in its lower position, thus opening the buzzer circuit and preventing operation of buzzer 62.

Should a question be of a true-false type, the operation will be similar to that described above with respect to self testing. For example, should the answer to a question be "true," square 64 will be light and square 65 dark, and depression of push button 23 will actuate the "correct" solenoid. If the answer should be "false," both squares 64 and 65 will be dark so that depression of push button 24 will actuate the correct solenoid. It should be observed that instead of having push buttons 23 and 24 act as both "C" and "D" multiple-choice answers and "true" and "false" answers, separate push buttons could be provided in parallel with push buttons 23 and 24 respectively to act as "true" and "false" buttons.

After the student has completed the card test, he will remove card 27, thus restoring switch 49 to its self test position and extinguishing card test lamp 29. The cards of all students in a class could then be evaluated by a punch card sorting machine, thus providing rapid and accurate information on the student's ability. Means indicated schematically at 123 is preferably provided for returning carriage 56 to its original position in response to withdrawal of card 27 from slot 26. Alternatively, means could be provided for retaining card 27 out of reach after the test so that it can be removed only by authorized personnel.

Film advance could be controlled in various ways within the principles of the invention. In one arrangement, each question could occupy sufficient frames to run for several seconds. The student could then use one of the controls indicated generally at 28 to advance the film intermittently. As an additional feature, a switch (not shown) controlled by a time delay relay could be placed in the projector motor circuit in response to energization of relays 50 and 51 when card 27 is placed in slot 26. Thus, each actuation of the forward motor control would advance the film only to the next question as long as the card remained in the slot. In cases where the formal test questions were preceded by a lecture or recitation on the same reel, the instructor on the film could warn the student to stop the motor as the test sequence approached. After inserting the test card, the student could then advance the film from question to question.

It should be noted that the number, position and arrangement of the concealed light and dark squares and their corresponding photocells could be varied to suit particular requirements. Thus, the number of possible choices in a multiple-choice question could be more than that shown in the illustrated embodiment. FIGURE 5 shows the utilization of the sound track area on a film for carrying information analogous to that in squares 64 and 65 of FIGURE 4. The film strip portion indicated at 201 in FIGURE 5 could be that which carries frames with a printed question, and thus does not utilize its sound track area 202 to carry a voice. Instead, a strip 203 and a strip 204 are provided on area 202, these strips being light or dark in the same manner as squares 64 and 65 are light or dark. Photocells 205 and 206 are responsive to the condition of strips 203 and 204 respectively, and are connected to amplifiers 207 and 208 which are adapted to control relays such as 42 and 43 of FIGURE 4. Alternatively, strips 203 and 204 could represent ultrasonic tones at two different predetermined frequencies, units 205 and 208 comprising means for detecting and amplifying the presence or absence of each of these tones to control relays 42 and 43. Ultrasonic tones could of course be recorded on separate tape instead of a film sound track.

FIGURE 6 illustrates another form of the invention which is especially adapted for use in a classroom where all students may watch a single instructor or projected presentation, but where it is desired that individual punch card tests be administered. Each desk in this embodiment comprises a frame 124 having a seat 125 at one end thereof and a desk 126 supported at the other end. Unlike the previous embodiment, no screen or projector housing is provided on desk 126 since the desk is intended for use in a classroom having a single instructor 127 or projected presentations 128. However, the rear portion 129 of desk 126 slopes upwardly and is provided with controls indicated generally at 131 for controlling the operation of punch card solenoids (not shown) which operate on a punch card 132 insertable in a slot 133. Although controls 131 are not described in detail, they will be the same as those described above with respect to FIGURE 4. If desired, the self testing feature of the invention may be omitted from this embodiment so that the desk will operate solely to record punch card tests. In operation, the instructor 127 or a projected image on screen 128 will provide multiple-choice or true-false questions which the students may answer by depressing the proper buttons in controls 131. Signals to the desks could be controlled by light and dark squares projected behind an enclosure 134 in one corerner of screen 128. Alternatively, these controls could be located on a reading desk 135 and operated by the class instructor.

The invention thus provides means for enabling students to obtain individual instruction at a rate in accordance with their abilities while in a classroom atmosphere, and at the same time enables an instructor by means of film or television techniques to reach a vast number of students simultaneously. The invention also incorporates in compact form a test administering apparatus which can be used not only by the student himself to test his attentiveness and comprehension, but also for formal recorded tests used for evaluation purposes.

While it will be apparent that the preferred embodiments herein demonstrated are well calculated to fulfill the objects above stated, it will be appreciated that the invention is susceptible to modification, variation and change without departing from the proper scope or fair meaning of the subjoined claims.

What is claimed is:

1. In combination, means for posing a series of questions to a student, means for receiving a test card corresponding with an individual student, a plurality of manually actuatable elements representing possible answers to a question, power-actuated means for marking said card "correct" or "incorrect" in response to the actuation of one of said elements, signaling means associated with said question posing means and operable after each question has been posed thereby, said signaling means having a plurality of forms corresponding with said plurality of manually actuatable elements, means for concealing said signaling means from the student, and means connecting said signaling means to said manually actuatable elements and said marking means whereby said test card will be marked "correct" or "incorrect" in accordance with the student's answer to each question.

2. In combination, a desk, screen projection means for posing a series of questions to a student seated at said desk, means on said desk for receiving a test card, a plurality of manually actuatable elements on said desk representing possible answers to a question, power-actuated means for marking said card "correct" or "incorrect" in response to the actuation of one of said elements, signaling means associated with said screen projection means and operable after each question has been posed thereby, said signaling means having a plurality of forms corresponding with said plurality of manually actuatable elements, means for concealing said signaling means from the student, and means connecting said signaling means to said manually actuatable elements and said marking means whereby said test card will be marked "correct" or "incorrect" in accordance with the student's answer to each question.

3. The combination according to claim 2, said signaling means comprising a screen, a pair of areas on said screen, said areas being of varying combinations of luminosity to represent various answers to questions, and photoelectric means for detecting said varying luminosities.

4. In combination, recorded question means for presenting a recorded series of questions to a student, recorded signal means associated with said recorded question means, said signal means being adapted to emit any of four distinct signals after each question corresponding to the correct answer to said question, a pair of relays controlled by said signal means, said relays being movable between a first position in which said first relay is deenergized and said second relay is energized, a second position in which both relays are energized, a third position in which said first relay is energized and said second relay is deenergized, and a fourth position in which both relays are deenergized, four manually actuatable switches on said desk, each of said switches having at least three contacts, a "correct" marking solenoid connected to the first and second contacts of each of said switches, an "incorrect" marking solenoid connected to the third contact of each switch, and four cutout relays having contacts in series with said third contacts of the switches, said cutout relays being connected across the first and second contacts of said switches, said signal relays when in their first, second, third and fourth positions applying voltage to the first and second contacts of said first, second, third and fourth switches respectively, whereby actuation of the correct switch after each question will cause said "correct" marking solenoid to be energized, and actuation of an incorrect switch will cause said "incorrect" marking solenoid to be energized.

5. In combination, means for posing a question to a student, a plurality of manually operable elements representing possible answers to said question, a record-bearing member, first recording means for recording on said record-bearing member that a correct answer has been selected by the student, second recording means separate from said first recording means for recording on said record-bearing member that an incorrect answer has been selected by the student, and control means operatively connected with said question posing means for enabling either said first or said second recording means to be actuated in accordance with the student's actuation of one of said elements.

6. In combination, means for posing a question to a student, a plurality of manually operable elements representing possible answers to said question, a first signal for indicating that a correct answer has been selected by the student, a second signal for indicating that an incorrect answer has been selected by the student, control means operatively connected with said question posing means for enabling said first or second signal to be actuated in accordance with the student's actuation of one of said elements, means responsive to simultaneous actuation of more than one element by the student for activating said second signal, and means responsive to lack of actuation of any element by the student after a question has been posed for activating said second signal.

7. In combination, a desk having a writing surface at the forward portion thereof, a housing mounted at the rear of said desk and raised above said writing surface, a projection screen at the forward portion of said housing facing a student seated at said desk, means within said housing for projecting an image on the screen to be viewed by the student, question carrying means adapted to be mounted in said projection means, a plurality of manually actuatable elements on said desk representing possible answers to a question, means for indicating the selection of a correct or an incorrect element by the student, signaling means synchronized with said question carrying means for signaling the correct answer to each question, and means connecting said signaling means to said manually actuatable elements and said indicating means, whereby the indicating means will be properly actuated.

8. In combination, a desk, screen projection means for posing a series of questions to a student seated at said desk, means on said desk for receiving a test card, a plurality of manually actuatable elements on said desk representing possible answers to a question, means for marking said card "correct" or "incorrect" in response to the actuation of one of said elements, signaling means associated with said screen projection means and operable after each question has been posed thereby, said signaling means including a pair of relays, each of said relays being movable between an energized and a deenergized position, whereby said relays in combination are adapted to assume any of four positions, said manually actuatable elements comprising four switches, and connecting means between said relays and said switches whereby each position of said relays will enable only one of said push buttons to cause said "correct" marking means to be actuated and will enable the other three switches to cause the "incorrect" marking means to be actuated.

9. In combination, a desk, screen projection means for posing a series of questions to a student seated at said desk, means on said desk for receiving a test card, a plurality of manually actuatable elements on said desk representing possible answers to a question, means for marking said card "correct" or "incorrect" in response to the actuation of one of said elements, said marking means comprising a "correct" punch card solenoid and an "incorrect" punch card solenoid, signaling means associated with said screen projection means and operable after each question has been posed thereby, means for concealing said signaling means from the student, means connecting said signaling means to said manually actuatable elements and said marking means whereby said test card will be marked "correct" or "incorrect" in accordance with the student's answer to each question, and means responsive to the actuation of any of said manually actuatable elements after a question has been posed to cause the card to be shifted relative to said solenoids.

10. In combination, a desk, a housing mounted at the rear of said desk, a projection screen at the forward end of said housing facing a student seated at said desk, visual presentation means within said housing for projecting an image on said screen to be viewed by the student, means for posing a question on said screen, a plurality of manually actuatable elements on said desk representing possible answers to said question, signal means associated with said projected image after a question has been posed, means for concealing said signal means from the student, each signal means corresponding to the correct answer to the preceding question, means connecting said signal means to said manually actuatable elements, an observable self test signal activatable in response to the selection of the correct manually actuatable element by the student and the reception by such element of a signal from said signal means, means on said desk for receiving a test card, "correct" and "incorrect" marking means for said card, means for selectively disenabling said self test signal and enabling said "correct" and "incorrect" marking means, means responsive to the selection of a correct manually actuatable element by the student when said marking means are enabled for causing the "correct" marking means to be actuated, and means responsive to the selection of an incorrect element for causing said "incorrect" marking means to be actuated.

11. In combination, a desk, a housing mounted at the rear of said desk, a projection screen at the forward end of said housing facing a student seated at said desk, visual presentation means within said housing for projecting an image on said screen to be viewed by the student, means for posing a question on said screen, a plurality of manually actuatable elements on said desk representing possible answers to said question, means associated with said visual presentation means for actuating a signal a predetermined time after a question has been posed, means responsive to the actuation of the correct manually actuatable element by the student for preventing operation of said signal, and means responsive to the simultaneous actuation by said student of both the correct manually actuatable element and an incorrect manually actuatable element for permitting said last-mentioned signal to operate.

12. In combination, motion picture projecting means, a motion picture film having a sound track and adapted to pose a series of questions to a student, signaling means on selected portions of said sound track capable of producing an ultrasonic vibration at a predetermined frequency for signalling the correct answer to each question, means for detecting the presence or absence of said vibration, a group of manually actuatable elements representing possible answers to a question, means for indicating whether an element selected by a student is correct or incorrect, and means connecting said detecting means to said manually actuatable elements and indicating means whereby the indicating means will be properly actuated.

13. The combination according to claim 12, said vibration producing means comprising means for producing ultrasonic vibrations at two different predetermined frequencies, said detecting means including a pair of relays movable to any of four positions depending on the presence or absence of either or both of said vibration frequencies, said manually actuatable elements comprising four switches, said connecting means enabling only one of said switches to cause said indicating means to indicate a correct answer and enabling the other three switches to cause the indicating means to indicate an incorrect answer.

14. The combination according to claim 12, further provided with a desk having a writing surface at the forward portion thereof, a housing mounted at the rear of said desk and raised above said writing surface, and a projection screen at the forward portion of said housing facing a student seated at said desk, said projecting means being enclosed within said housing, said manually actuatable elements being carried by said desk.

15. The combination according to claim 12, further provided with means for receiving a test card, said indicating means including means for perforating said card to indicate a correct or incorrect answer to each question.

16. In combination, a housing, a projection screen at the forward end of said housing adapted to face a student, visual presentation means within said housing comprising a motion picture film strip for posing a question on said screen to be viewed by the student, a plurality of manually actuatable elements on said housing representing possible answers to said question, signal means carried by said motion picture film strip adjacent a series of frames after a question has been posed, said signal means having a plurality of forms corresponding with said plurality of manually actuatable elements, means for concealing said signal means from said student, said signal means corresponding to the correct answer to the preceding question, means connecting said signal means to said manually actuatable elements, a first test evaluating signal activatable in response to the selection of the correct manually actuatable element by the student and the reception by such element of a signal activated by said signal means, additional signal means carried by said motion picture film strip and adapted to become operative after said question has been posed on the screen, a second test evaluation signal activatable in response to said additional signal means, and means responsive to the selection of the correct manually actuatable element by the student before said additional signal means has become operative for overriding said additional signal means and preventing activation of said second test evaluation signal.

References Cited in the file of this patent

UNITED STATES PATENTS

| | | |
|---|---|---|
| Re. 23,030 | Holt | Aug. 24, 1948 |
| 2,104,718 | Dougherty | Jan. 4, 1938 |
| 2,149,459 | Morehouse | Mar. 7, 1939 |
| 2,311,055 | Kopas | Feb. 16, 1943 |
| 2,514,289 | Nye | July 4, 1950 |
| 2,533,010 | Henabery | Dec. 5, 1950 |
| 2,564,089 | Williams | Aug. 14, 1951 |
| 2,798,669 | Hale | July 9, 1957 |
| 2,835,052 | Raich | May 20, 1958 |
| 2,870,548 | Chedister | Jan. 27, 1959 |